US011916492B2

(12) United States Patent
Bailly et al.

(10) Patent No.: US 11,916,492 B2
(45) Date of Patent: Feb. 27, 2024

(54) DEVICE FOR SUPPLYING POWER FROM AN AC VOLTAGE

(71) Applicant: Commissariat à l'Energie Atomique et aux Energies Alternatives, Paris (FR)

(72) Inventors: Alain Bailly, Rousset (FR); Dominique Bergogne, Grenoble (FR); Thierry Bouchet, Grenoble (FR)

(73) Assignee: Commissariat à l'Energie Atomique et aux Energies Alternatives, Paris (FR)

(*) Notice: Subject to any disclaimer, the term of this patent is extended or adjusted under 35 U.S.C. 154(b) by 264 days.

(21) Appl. No.: 17/596,201

(22) PCT Filed: Jun. 16, 2020

(86) PCT No.: PCT/EP2020/066636
§ 371 (c)(1),
(2) Date: Dec. 4, 2021

(87) PCT Pub. No.: WO2020/254328
PCT Pub. Date: Dec. 24, 2020

(65) Prior Publication Data
US 2022/0255454 A1 Aug. 11, 2022

(30) Foreign Application Priority Data

Jun. 17, 2019 (FR) .................................... 1906463

(51) Int. Cl.
*H02M 7/217* (2006.01)
*H02M 1/08* (2006.01)
*H02M 3/158* (2006.01)
(52) U.S. Cl.
CPC ........... *H02M 7/217* (2013.01); *H02M 1/083* (2013.01); *H02M 3/158* (2013.01)

(58) Field of Classification Search
CPC ...... H02M 1/12; H02M 3/3155; H02M 3/158; H02M 3/33507; H02M 3/33546;
(Continued)

(56) References Cited

U.S. PATENT DOCUMENTS 3,371,263 A    2/1968   Walz et al.
4,260,932 A *  4/1981   Johnson ............. H05B 41/2325
                                                        315/229

(Continued)

FOREIGN PATENT DOCUMENTS

EP          3346597 A1     7/2018
EP          3346598 A1     7/2018
WO       2013099918 A1     7/2013

OTHER PUBLICATIONS

International Search Report for International Application No. PCT/EP2020/066636 dated Aug. 27, 2020, 2 pages.
"LLC Resonant AC/DC Switched-Mode Power Supply using the MC56F8013 and MC56F8257," Freescale Seminconductor, Inc. (2012).

(Continued)

*Primary Examiner* — Jeffrey A Gblende
(74) *Attorney, Agent, or Firm* — Moreno IP Law LLC

(57) ABSTRACT

The present description concerns a device for delivering a voltage from an AC voltage, comprising a capacitive element (120), two switches (132H, 132L) in a half-bridge between terminals of the capacitive element (120); terminals (102, 104) of application of the AC voltage; a transformer (160), comprising a first winding (162) coupling to a junction node (136) between the switches (132H, 132L) one of the terminals (104) of application of the AC voltage; and one or a plurality of circuits (170, 180, 140), configured to switch the switches (132H, 132L) and receive an AC current (I164) flowing through a second winding (164) of the transformer (160) and regulate the voltage delivered by the device by acting on a frequency of said AC current and/or on a phase shift of said AC current with respect to its reception.

15 Claims, 6 Drawing Sheets

(58) Field of Classification Search
CPC ............ H02M 7/1557; H02M 7/1626; H02M 1/4208; H02M 7/53871; H02M 7/12; H02M 7/219; H02M 7/151; H02M 1/4233; H02M 5/4585; H02M 7/217; H02M 1/08; H02M 7/1552; H02M 7/1623; H02M 1/4225; H02M 3/33592; H02M 3/073; H02M 3/10; H02M 3/135; H02M 3/137; H02M 7/10; H02M 7/00; H02M 7/06; H02M 7/064; H02M 7/068; H02M 3/156; H02M 7/5387; H02M 1/083; G05F 1/30; G05F 1/33; G05F 1/32; G05F 1/34; G05F 1/38; G05F 1/52; H02J 7/12

See application file for complete search history.

(56) References Cited

U.S. PATENT DOCUMENTS

| | | |
|---|---|---|
| 7,564,706 B1 | 7/2009 | Herbert |
| 2008/0259645 A1 | 10/2008 | Herty et al. |
| 2014/0028185 A1* | 1/2014 | Nobata .................. H05B 45/44 315/51 |
| 2018/0183344 A1* | 6/2018 | Iwaya ............... H02M 3/33592 |

OTHER PUBLICATIONS

Written Opinion of the International Search Authority for International Application No. PCT/EP20201066636 dated Aug. 27, 2020, 5 pages.

* cited by examiner

DEVICE FOR SUPPLYING POWER FROM AN AC VOLTAGE

FIELD

The present disclosure generally concerns electronic circuits and, more particularly, devices enabling to supply an electric power from an AC voltage.

BACKGROUND

Various devices are electrically powered by a voltage different from that of an electric power supply network. For example, mobile electronic devices, such as connected objects, cell phones, digital tablets, comprise an electric power storage such as a battery. The battery is charged by a typically DC voltage, for example, of 5 V. This voltage may also be used to directly power equipment. A power supply device enables to obtain this voltage from an AC voltage of an electrical network, typically at approximately 230 V (rms.) and 50 Hz, or at approximately 120 V (rms.) and 60 Hz.

SUMMARY

An embodiment overcomes all or part of the disadvantages of known devices of electric power supply from an AC voltage.

An embodiment provides an electric power supply device heating less than known devices, for a same supply power.

An embodiment provides an electric power supply device having a higher conversion efficiency than that of known devices.

An embodiment provides a particularly compact electric power supply device.

Thus, an embodiment provides a device for delivering a DC voltage between two output terminals from an AC voltage applied to input terminals, comprising:
a first capacitive element;
two first switches in a half-bridge between terminals of the first capacitive element;
two switches electrically in series between the terminals of the first capacitive element (120)
a transformer, comprising a first coil placed between one of the input terminals and a junction node between the first switches, the other one of the input terminals (102) being coupled to a junction node (134) between the second switches;
a full wave rectifying circuit delivering the DC voltage, comprising: two second capacitive elements electrically in series between the output terminals; and two third switches, each placed between one of the output terminals and a second winding of the transformer
a circuit, configured to switch the switches and to control the second switches;
a circuit configured to control the voltage delivered by the device, acting on the switching frequency and/or on a delay between times when an AC current flowing through the second winding changes direction and next times of switching of the third switches.
According to an embodiment, the device comprises:
a voltage sensor (182) delivering a value of the DC voltage; and
a circuit (180) configured to act on the switching frequency and/or on said delay based on the value of the DC voltage.

According to an embodiment, the device comprises a circuit configured to, at each halfwave of the AC voltage, turn on a single one of the second switches during at least a central phase of the halfwave, said single one of the second switches being a function of the sign of the halfwave.

According to an embodiment, the device comprises a circuit configured to regulate a mobile average of a current flowing through the input terminals, according to a current set point, by acting on a duty factor of the switching of the first switches.

According to an embodiment, the current set point has a value representative of a result of the multiplication of a conductance value by a value of the AC voltage.

According to an embodiment, the device comprises a circuit configured to regulate a value of the voltage of said capacitive element by acting on said conductance value.

According to an embodiment, the device comprises, for at least one of the terminals of the first capacitive element, an additional capacitive element coupling to the terminal of the first capacitive element said one of the input terminals.

According to an embodiment, the device comprises a circuit configured to block the second switches during phases of transition between said central phases.

According to an embodiment, the device comprises a circuit configured to, at each transition phase, progressively vary a duty factor of the switching of the first switches, to obtain a predefined value of the voltage across that of the second switches which will be turned on during the central phase following the transition phase.

According to an embodiment, the central phase following each transition phase starts at the time when the AC voltage has said predefined voltage value.

According to an embodiment, the transition phase following each central phase starts at the time when the AC voltage has said predefined value.

According to an embodiment, the device comprises a circuit configured to obtain a zero voltage between the terminals of each of the first switches at the switching times.

According to an embodiment, the transformer has a coupling coefficient smaller than 1.

According to an embodiment, the first switches are HEMT-type transistors.

An embodiment provides a device of power supply by USB-C connector comprising a device such as defined hereabove.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF THE PRESENT EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail.

Unless specified otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
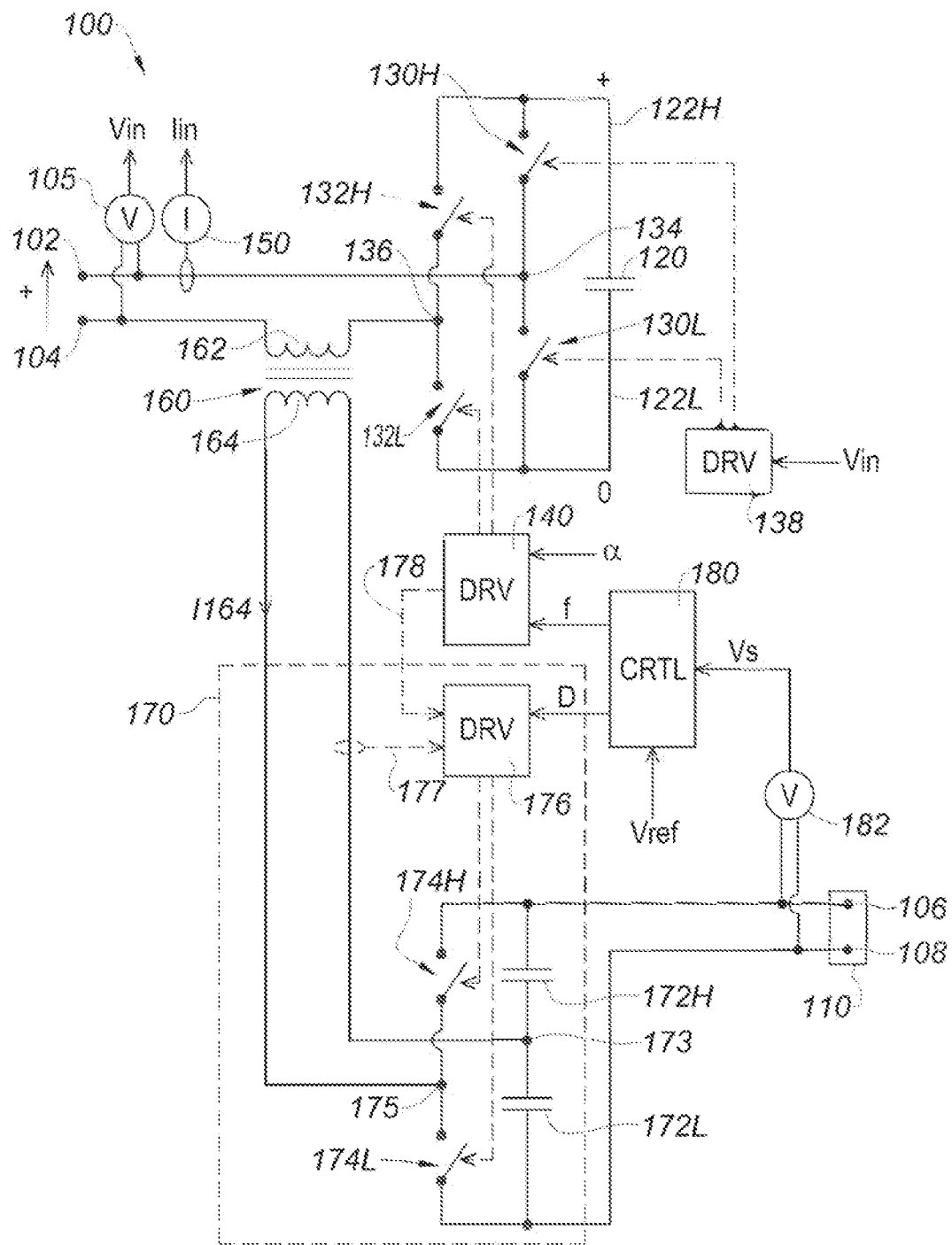
FIG. 1 schematically shows an embodiment of a device of electric power supply from an AC voltage.

FIG. 1 schematically shows an embodiment of a device 100 of electric power supply from an AC voltage of value Vin.

Preferably, the AC voltage is that of an electrical network, and has voltage and frequency values such as mentioned as a preamble. This is not limiting, and the AC voltage may have other voltage values, preferably a peak value smaller than approximately 1.5 kV, and/or other frequencies, preferably smaller than approximately 1 kHz. For example, the voltage may be delivered by an embarked device, for example, a vehicle alternator, or by an embarked power supply network.

The AC voltage is applied to nodes 102 and 104 forming input terminals of device 100. When this AC input voltage is that of a network comprising a phase and a neutral, the two phase/neutral directions of application to nodes 102 and 104 are possible. Preferably, device 100 comprises a voltage sensor (V) 105 coupled, preferably connected, to nodes 102 and 104. Sensor 105 delivers, at each time, the value Vin of the input voltage.

Device 100 delivers a voltage for powering an electronic device (not shown) between terminals 106 and 108. Terminals 106 and 108 thus form output terminals of the device. Preferably, device 100 comprises a connector 110 allowing an electric connection to the electronic device to be powered. For example, connector 110 is a C-type USB ("Universal Serial Bus") connector, currently called USB-C connector. Output terminals 106 and 108 for example correspond to some of the pins of the USB-C connector. This example is not limiting, the described embodiments being compatible with usual modes of connection to an electronic device.

Preferably, the voltage delivered by device 100 is a DC voltage, for example, of 5 V. The device thus forms an AC/DC converter. As an example, the power supplied by device 100 may vary, in operation, between zero and a maximum power. The maximum power is for example smaller than 500 W, preferably smaller than or equal to 100 W, more preferably equal to 100 W. This example is not limiting, and the device may deliver other DC voltage levels.

Device 100 comprises a capacitive element 120 having two terminals 122H and 122L. Preferably, capacitive element 120 comprises, for example, is formed by a capacitor or an assembly of capacitors electrically in parallel and/or in series between terminals 122H and 122L.

Device 100 comprises switches 130H and 130L in series between terminals 122H and 122L of capacitive element 120. Device 100 further comprises switches 132H and 132L in series between terminals 122H and 122L of capacitive element 120. More precisely, terminal 122H is coupled, preferable connected, to switches 130H and 132H. Terminal 122L is coupled, preferably connected, to switches 130L and 132L. A node 134 couples in series, preferably connects in series, switches 130L and 130H. A node 136 couples in series, preferably connects in series, switches 132H and 132L.

Preferably, switches 130H, 130L, 132H, and 132L comprise, or are formed by, transistors. The transistors preferably are of field-effect type, for example of MOS type. The channel types of the transistors are then usually defined according to the signs of the voltages blocked by the transistors and of the control signals applied to the transistors. More preferably, the transistors forming switches 130H, 130L, 132H, and 132L are of high electron mobility transistor, HEMT, type, for example comprising gallium arsenide semiconductors. Such transistors have a particularly high conductance in the on state, which allows a particularly high power efficiency. Transistors are preferably of normally-off type but may also be of normally-on type. It will be within the abilities of those skilled in the art to adapt the described embodiments to transistors of normally-on type, for example, as described in D. Bergogne et al.'s document, "Normally-On SiC JFETs in power converters: Gate driver and safe operation,", 2010 6th International Conference on Integrated Power Electronics Systems, Nuremberg, 2010, p. 1-6.

Switches 130H and 130L are for example controlled by a control circuit 138 (DRV). According to an embodiment, control circuit 138 receives the value Vin of the AC voltage. Circuit 138 is then configured so that switch 130H is conductive (on) and switch 130L is non-conductive (off), when the potential of node 102 is greater than that of node 104, that is, when the AC voltage between nodes 104 and 102 is in a positive halfwave. Similarly, switch 130L is on, and switch 130H is off, when the potential of node 102 is smaller than that of node 104, that is, when the AC voltage between nodes 104 and 102 is in a negative halfwave. This is not limiting, and the signs of the halfwaves may be exchanged, and/or switches 130H and 130L may be controlled according to other embodiments, such as those described hereafter in relation with FIGS. 3 to 5.

Switches 132H and 132L are controlled by a control circuit 140 (DRV). In operation, control circuit 140 enables to alternately turn on switch 132H and switch 132L. The switch which has not been turned on is off. In other words, switches 132H and 132L are switched in opposition. The switches thus form a controlled half-bridge. Each switching corresponds to the switching from a state where one of the switches of the half-bridge is on to a state where the other one of the switches of the half-bridge is on. The steps of each switching enable in particular to avoid for the two switches of the half-bridge to be on at the same time during the switching. For example, to facilitate these steps, it may be provided for each of the switches of the half-bridge to be a transistor comprising a diode having its anode formed by the source of the transistor and its cathode formed by the drain of the transistor. The described embodiments are compatible with usual steps of switching of a controlled half-bridge.

Each switch 132H, 132L thus successively switches from the on state to the off state. This succession of states, or cycle, is repeated at a frequency f called switching frequency. The on/off states of switch 132H are controlled with a duty factor α, defined at each cycle by the ratio of the duration of the on state of switch 132H to the total duration of the cycle. The switching frequency and the duty factor are for example received by circuit 140. Non-limiting examples of circuits providing duty factor α are described hereafter in relation with FIGS. 3 to 6. As a variant, the duty factor is defined by the ratio of the duration of the on state of switch 132L to the total duration of the cycle.

Switching frequency f is in a range of switching frequencies greater than the frequency of the AC voltage, for example, 10 times, preferably 100 times, more preferably 1,000 times greater than the frequency of the AC voltage. As an example, the switching frequency range is between 50 kHz and 10 MHz, preferably between 100 kHz and 3 MHz.

One of the nodes of application of the AC voltage (node 102) is coupled, preferably connected, to node 134. The junction between nodes 102 and 134 preferably comprises a current sensor 150 (I). Sensor 150 delivers at any time the value Iin of the current entering device 100 through node 102. The junction between nodes 102 and 136 preferably has a resistance value smaller than 10 mΩ, more preferably smaller than 5 mΩ, even in the presence of current sensor 150.

The other one of the nodes of application of the AC voltage (node 104) is coupled, preferably connected, to node 136 by a winding 162 of a transformer 160. In other words, winding 162 is placed between nodes 104 and 136. Transformer 160 further comprises another winding 164. In a variant, current sensor 150, instead of being between nodes 102 and 134, is located between nodes 104 and transformer 160 or between transformer 160 and node 136.

Transformer 160 has a leakage inductance, corresponding to a coupling coefficient smaller than 1 of the transformer between its windings 162 and 64. The transformer preferably has, between its windings 162 and 164, a coupling coefficient smaller than 1, for example, between 0.8 and 0.98. The transformer has such a coupling coefficient for at least one frequency of the switching frequency range, for example for all the values of the frequency range. The effects of the coupling coefficient may be obtained by adding an external inductance in series.

Device 100 further comprises a circuit 170 coupled, preferably connected, across winding 164. Circuit 170 is coupled, preferably connected, to terminals 106 and 108. Circuit 170 is configured to deliver the voltage delivered by device 100 between terminals 106 and 108.

According to a preferred embodiment, circuit 170 comprises two capacitive elements 172H and 172L, coupled, preferably connected, in series between output terminals 106 and 108. Thus, a node 173 couples, preferably connects, in series capacitive elements 172H and 172L. Capacitive elements 172H and 172L may each comprise or be formed by a capacitor or a plurality of capacitors connected in series and/or in parallel.

Preferably, circuit 170 comprises two switches, 174H and 174L, coupled, for example, connected, electrically in series between output terminals 106 and 108. Switches 174H and 174L are preferably transistors. Thus, a node 175 couples, preferably connects, electrically in series switches 174H and 174L. Switches 174H and 174L are controlled by a control circuit 176 (DRV), for example contained in circuit 170. Switches 174H and 174L form a controlled half-bridge. Winding 164 couples, preferably connects, nodes 173 and 175 to each other. Thus, switches 174H and 174L couple, preferably connect, the respective terminals 106 and 108 to winding 164. In other words, switches 174H and 174L are placed between the respective terminals 106 and 108 and winding 164.

In operation, the switchings of switches 132H and 132L cause, in winding 164, a current I164 alternately flowing in both directions at switching frequency f. As an example, the switching times of switches 174H and 174L are determined, for example, by circuit 176, based on a current value I164 (sensor 177) and/or based on a signal 178 of synchronization with respect to the switching frequency (for example originating from circuit 140). As an example, when current I164 flows from node 173 to node 175, Switch 174H is on and switch 174L is off, which causes the charge of capacitive element 172H. When current I164 flows from node 175 to node 173, switch 174L is on and switch 174H is off, which causes the charge of capacitive element 172L. Thus, circuit 170 receives the AC current flowing through the winding 164 of transformer 160, each capacitive element receiving the current flowing in one of the two directions, which generates a positive DC voltage between output terminals 106 and 108, across element 110.

Circuit 170 thus receives the current flowing in both directions of winding 164 and, based on this current, delivers the DC output voltage. Thus, circuit 170 forms a full wave rectifying circuit delivering the DC voltage. The above-described preferred embodiment of circuit 170 is not limiting, and circuit 170 may be replaced with any circuit adapted to receiving the current flowing through winding 164, preferably in both directions. Preferably, such a circuit comprises two capacitive elements, each arranged to receive the current flowing in one of the two directions. Preferably, the flowing of the current in one or the other of the two directions is allowed by the turning on of one or the other of two switches.

Transformer 160 may comprise, instead of winding 164, a plurality of windings. Circuit 10 may then be replaced by any full wave rectifying circuit adapted to receiving one or a plurality of currents flowing through these windings. Preferably, the flowing of this or these currents is allowed by the turning on of switches. Examples of such circuits capable of replacing circuit 170 are described hereafter in relation with FIGS. 7 and 8.

Further, although a transformer with two windings only, and a single circuit for receiving the currents flowing through the transformer, have been described herein, a transformer having more than two windings may be provided. A plurality of circuits for receiving the currents flowing through the windings of the transformer may then be provided. As a variant, the transformer may be replaced with a plurality of transformers having windings in series between nodes 104 and 136.

Device 100 further comprises a circuit 180 (CTRL). Circuit 180 receives the value Vs of the output voltage delivered by device 100 between output voltages 106 and 108. Value Vs is for example delivered by a voltage sensor 182 (V) connected to terminals 106 and 108. Circuit 180 controls the output voltage. Preferably, circuit 180 enables to adjust or to regulate the output voltage, that is, to obtain for the value Vs of the output voltage to be equal to a set point value Vref. Preferably, set point value Vref is constant, that is, corresponds to a DC output voltage, for example, of 5 V. This is not limiting, and set point value Vref may vary over time.

According to an embodiment, to obtain the equality between voltage and set point values Vs and Vref, circuit 180 acts on the frequency of AC current I164, that is, the switching frequency f of the half-bridge of switches 132H and 132L. If value Vs is smaller than set point value Vref, frequency f is decreased. As illustrated hereafter in relation with FIG. 2, this increases the value Vs of the output voltage. Similarly, if value Vs is smaller than set point value Vref, frequency f is increased. This results in a decrease in the value Vs of the output voltage. Thus, frequency f plays the role of an adjustment variable, on which it is acted to regulate value Vs according to the set point value. The way to obtain an adjustment variable from a value to be regulated and from a set point value is not described in detail herein, the described embodiments being compatible with usual methods for obtaining an adjustment variable from a value to be regulated and from a set point value.

According to an embodiment, to obtain the equality between voltage and set point values Vs and Vref, circuit 180 acts on the phase shift D between AC current I164 and the cycles of reception of the two directions of this current. In other words, the switching cycles of switches 174H and 174L are phase-shifted with respect to the alternations between the two directions of AC current I164. Phase shift D corresponds to a delay between the time when current I164 changes direction and the next time of the switching of switches 174H and 174L. If value Vs is greater than set point value Vref, phase shift D is increased. As illustrated hereafter in relation with FIG. 2, this results in a decrease in the value Vs of the output voltage. Similarly, if value Vs is smaller than set point value Vref, phase shift D is decreased, which results in an increase in the value Vs of the output voltage. Thus, phase shift D plays the role of an adjustment variable, on which it is acted to regulate value Vs according to the set point value.

As a variant, circuit 180 delivers two phase shift values. One of the phase shift values corresponds to the delay of the time when switch 174L turns on and switch 174H turns off with respect to the time when current I164 starts flowing from node 173 to node 175. The other one of the phase shift values corresponds to the delay of the time when switch 174H turns on and switch 174L turns off with respect to the time when current I164 starts flowing from node 175 to node 173.

Thus, preferably, circuit 180 regulates the value Vs of the output voltage with respect to set point value Vref by acting on frequency f and/or on phase shift D. More preferably, to regulate the value Vs of the output voltage with respect to set point value Vref, circuit 180 acts on frequency f and on phase shift D, simultaneously or in turns. As a variant, circuit 180 controls value Vs without regulating it. In this variant, the frequency and phase shift values f and D corresponding to the desired value of voltage Vs are predefined according to various operating parameters, such as the value of a supplied current, of the voltage received and/or of the current received by device 100.

Preferably, a frequency threshold, for example, the upper limit of a switching frequency range, and a phase shift threshold, for example, the zero phase shift, are selected. In a first operating mode, circuit 180 acts on frequency f by maintaining phase shift D equal to the phase shift threshold while frequency f remains smaller than the frequency threshold. If frequency f reaches the frequency threshold, circuit 180 switches to a second operating mode. In the second operating mode, circuit 180 acts on phase shift D by maintaining frequency f equal to the frequency threshold, as long as phase shift D remains greater than the phase shift threshold. If phase shift D reaches the phase shift threshold, circuit 180 switches to the first operating mode.

To obtain a regulated voltage from the AC voltage, there could have been provided an input stage enabling to supply a power storage such as a capacitor from the AC voltage, and then an output stage converting the voltage of the power storage into a regulated output voltage.

As compared with such a device of power storage between two stages, device 100 comprises fewer switches and has a higher power efficiency. The smaller number of switches enables, for a same supplied power, to obtain a more compact device. The higher efficiency enables to spare power and to decrease the heating in operation.

Preferably, device 100 is located in a non-ventilated wall socket. The fact of increasing the compactness and of decreasing the heating in operation facilitates the forming of a non-ventilated wall socket comprising a device such as device 100.

Preferably, device 100 further comprises circuits, not shown, configured to obtain a zero voltage between the terminals of each of switches 132H and 132L at the time of the switchings. Such an operating mode of a switch half-bridge is said to be of ZVS, "Zero Voltage Switching", type. The described embodiments are compatible with usual ZVS-type switching circuits. This enables to decrease the dimensions of the components and/or to increase the efficiency and/or to increase the upper limit of the switching frequency range.

Figure 2:
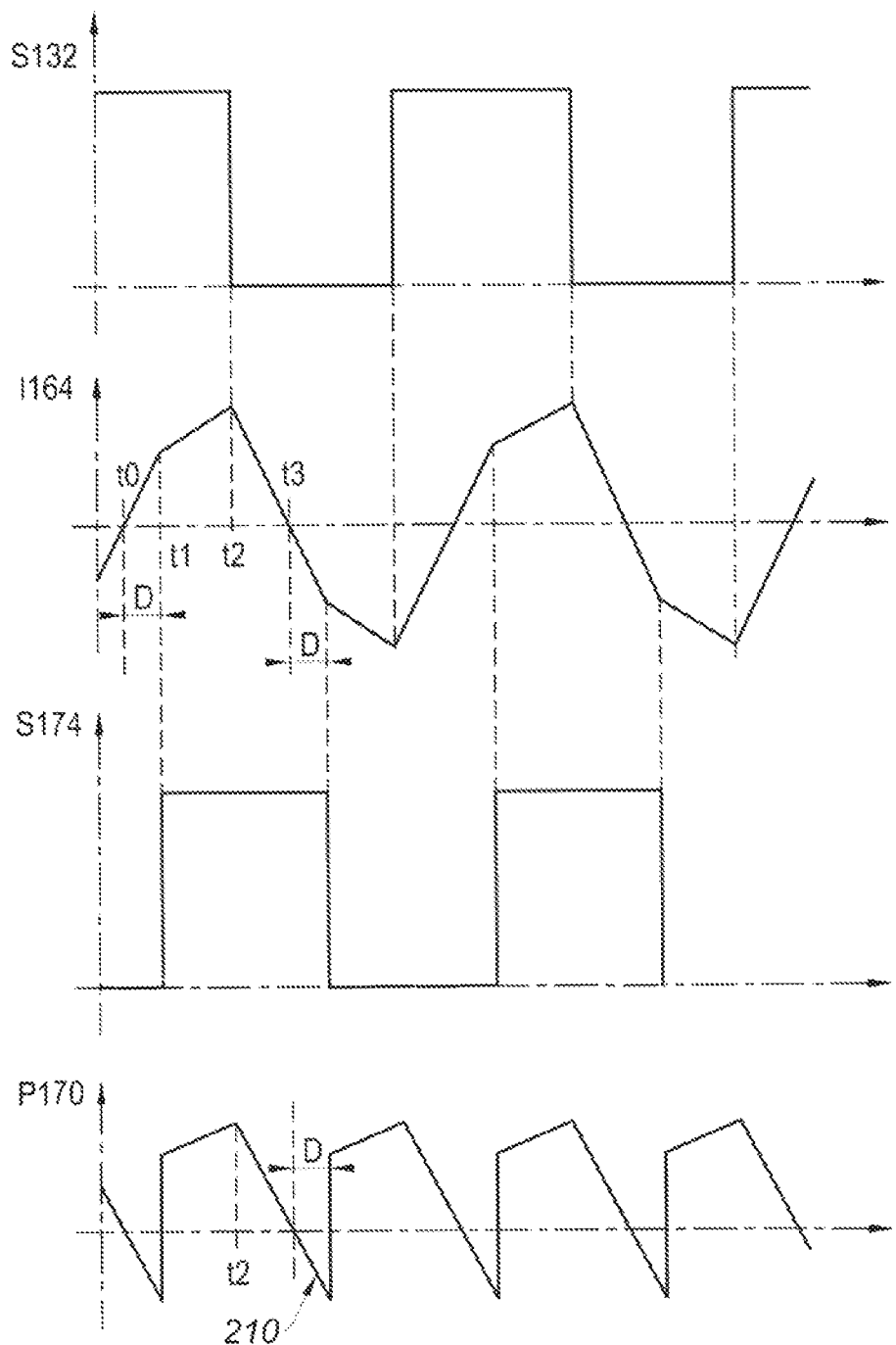
FIG. 2 is a timing diagram schematically showing an operation of the device of FIG. 1.

FIG. 2 is a timing diagram schematically showing an operation of the device of FIG. 1. More precisely, FIG. 2 shows shapes of a control signal S132 of switch 132H, of the current I164 in winding 164, of a signal S174 for controlling switch 174H, and of a power P170 received by circuit 170 (here, by capacitive elements 172H and 172L). Current I164 is represented in algebraic values, positive values corresponding to the flow direction from node 173 to node 175 and negative values corresponding to the other direction.

Two switching cycles of switches 132L and 132H are shown. The voltages in capacitive elements 120, 172H, 172L and the AC input voltage do not have time to substantially vary during these two cycles. The shown example takes place during a positive halfwave of the input voltage (potential of node 102 greater than that of node 104), and for a duty factor α in the order of 0.5.

Signal S132 is initially in a high state, and thus switch 132H is on and switch 132L is off. This causes an increase in current I164. The selected coupling coefficient of the transformer, smaller than 1, enables to limit the rate at which current I164 increases, due to the leakage inductance resulting from this coupling coefficient.

Current I164, initially at a negative value, becomes zero at a time t0. At a time t1, after a delay corresponding to phase shift D, signal S174, initially at a low level, switches to a high level. Thus, switch 174H turns, and switch 174L switches to the off state. From time t1, current I164 increases slower than between times t0 and t1. From time t1, circuit 170 receives power, and this received power P170 increases.

At a time t2, signal S132 switches to a low level. Thus, switch 132H switches to the off state and switch 132L turns on. From this time, current I164 decreases after having reached a maximum value, as well as the received power P170. The lower frequency f, the more current I170 has time to increase, and the higher the maximum value reached by the current. In other words, the lower frequency f, and the lower the impedance linked to the leakage inductance, which increases current I164. Thus, the maximum values of the received power increase. A decrease in frequency f thus causes an increase in output voltage value Vs. Similarly, an increase in frequency f causes a decrease in output voltage value Vs.

At a time t3, current I164 becomes zero. After time t3, as long as the delay corresponding to phase shift D has not elapsed, switches 174H and 174L remain in the respectively on and off states. The current direction reverses, that is, capacitive element 172H discharges. This corresponds to a power returned by circuit 170 to transformer 160. Power P170, in algebraic values, then takes negative values 210. The higher phase shift D, the more the power returned by circuit 170 increase. This results in a decrease in output voltage value Vs. Similarly, a decrease in phase shift D causes an increase in the output voltage.

Figure 3:
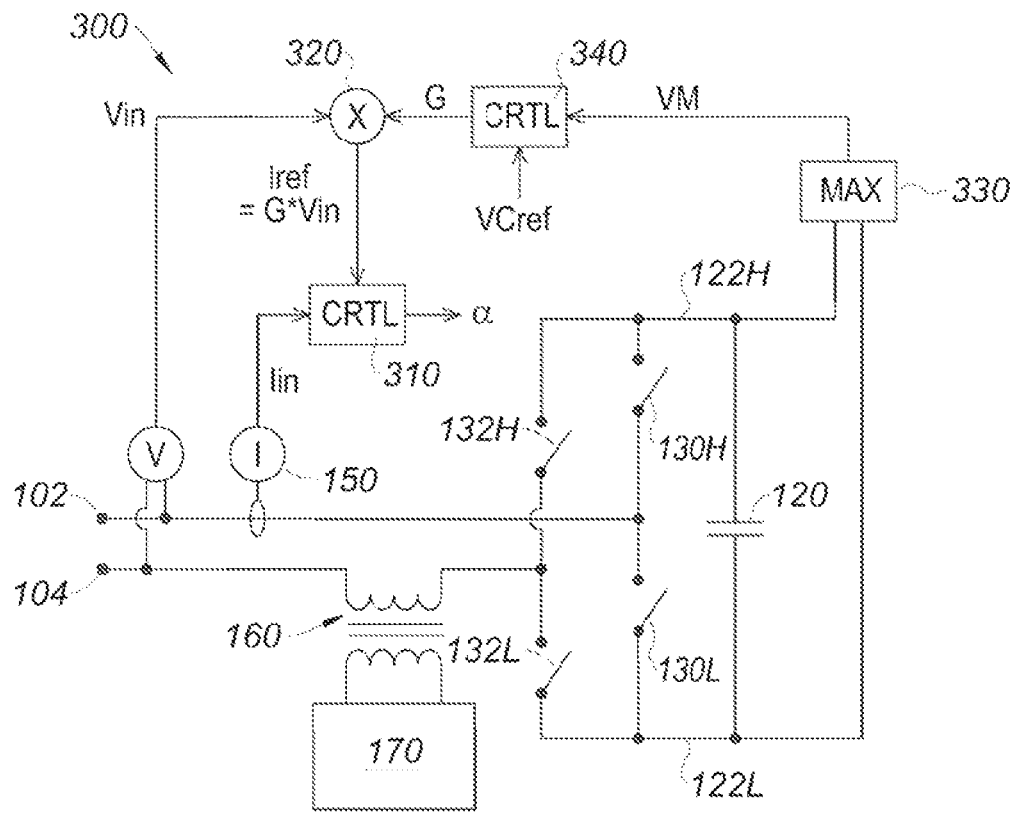
FIG. 3 schematically and partially shows another embodiment of a device of electric power supply from an AC voltage.

FIG. 3 partially and schematically shows an embodiment of a device 300 of electric power supply from an AC voltage of value Vin.

Device 300 comprises the same elements as the device 100 of FIG. 1, arranged identically or similarly. These elements are not described again herein. Circuits 138, 140, 176, and 180 have not been shown in FIG. 3. Device 300 corresponds to device 100 where elements have further been added. More precisely, these added elements form an example of circuits adapted to generating a value of the switching duty factor □ of switches 132H and 132L.

Device 300 comprises a circuit 310 (CTRL) receiving the value Iin of the input current, supplied by current sensor 150. Circuit 310 delivers duty factor α. More precisely, circuit 310 is configured to obtain an equality between the average of value Iin during each switching cycle of switches 132H and 132L, that is, a mobile average, or sliding average, of Iin, and a current set point value Iref. As an example, the mobile average is obtained by filtering of value Iin by a low-pass filter, for example, having a cutoff frequency smaller than frequency f.

To obtain the equality between the mobile average of value Iin and of set point value Iref, circuit 310 acts on duty factor α. In other words, circuit 310 uses duty factor α as an adjustment variable to regulate the input current according to set point value Iref.

Preferably, set point value Iref corresponds to the result of the multiplication (multiplication circuit 320) of value Vin of the AC input voltage by a conductance value G (Iref=G*Vin). Thus, the value Iin of the current entering through node 102, that is, for example, supplied by the electrical network, is proportional to the AC voltage. This enables to avoid creating various reactive powers in the electrical network. This enables device 300 to be easily made in compliance with various standards concerning the harmonics level of the current consumed on an electrical network, such as the EN 61000-3-2 standard.

Preferably, the device further comprises a circuit 330 (MAX) coupled, for example, connected, to terminals 122H and 122L of capacitive element 120. As an example, circuit 330 delivers the maximum value VM of the voltage between terminals 122H and 122L reached during each halfwave of the AC input voltage. Value VM is received by a circuit 340 (CTRL) which delivers conductance value G. Circuit 340 is configured to obtain an equality between value VM and a set point VCref, by acting on conductance value G. In other words, circuit 340 uses conductance G as an adjustment variable to regulate the charge of capacitive element 120 according to set point value Iref. Circuit 340 is compatible with known methods for obtaining an adjustment variable from a value to be regulated and from a set point value. Although as a specific example, the value regulated by circuit 340 has value VM, the value regulated by circuit 340 may be any value representative of the voltage of capacitive element 120, or any value having variations which would be linked to those of this voltage level.

In the embodiments described hereabove in relation with FIGS. 1 and 3, distinct circuits 138, 140, 176, 180, 310, 320, 330 and 340, that is, an assembly of circuits, have been described. According to other embodiments, all or part of these circuits are replaced with a digital circuit comprising a memory and a processing unit such as a microprocessor. This digital circuit is configured to carry out the functions of the circuits that it replaces, that is, the memory comprises a program having its execution by the processing unit causing the implementation of the above-described functions.

Figure 4:
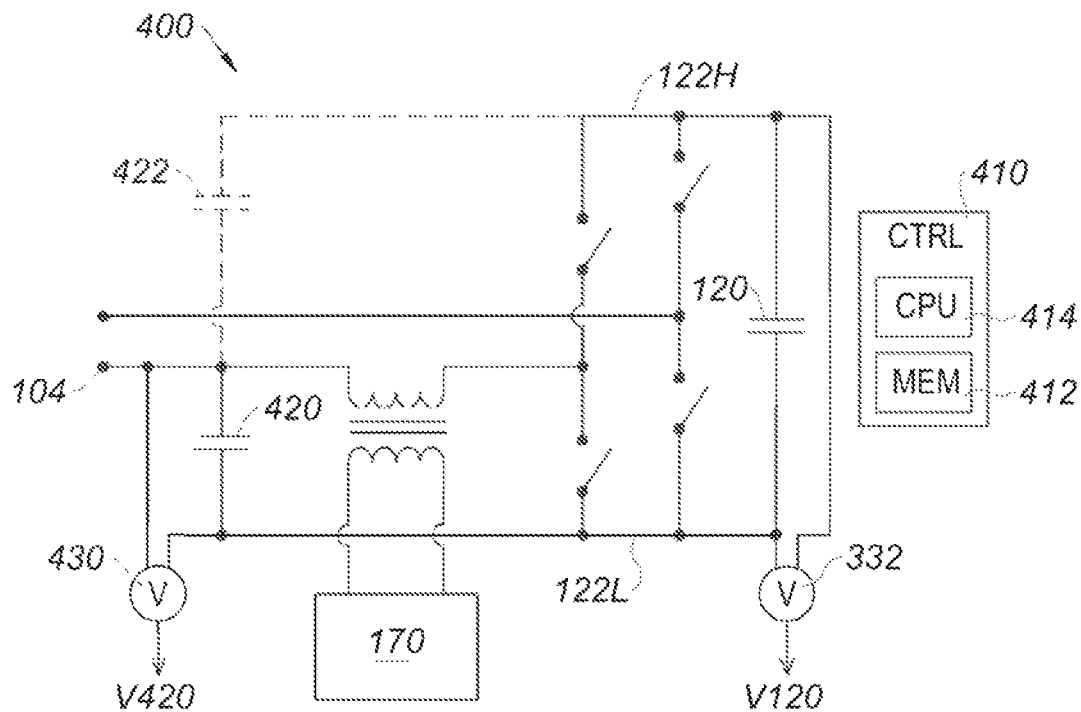
FIG. 4 partially and schematically shows another embodiment of a device of electric power supply from an AC voltage.

FIG. 4 partially and schematically shows an embodiment of a device 400 of electric power supply from an AC voltage.

Device 400 comprises elements identical or similar to those of the device 100 of FIG. 1, arranged identically or similarly. These elements are not described again in detail.

Device 400 comprises a circuit 410 (CTRL) comprising a memory 412 (MEM) and a processing unit 414 (CPU). Preferably, all or part of the functions of the circuits 138, 140, 176, 180 described in relation with FIG. 1 are carried out by circuit 410. More preferably, all or part of the functions of the circuits 138, 140, 176, 180 described hereabove in relation with FIG. 3 are further carried out by circuit 410.

Preferably, device 400 further comprises a capacitive element 420 coupling, preferably connecting, terminals 104 and 122L. As a variant, device 400 comprises a capacitive element 422 (in dotted lines) coupling, preferably connecting, terminals 104 and 122H. More preferably, device 400 comprises both capacitive element 420 and capacitive element 422. Capacitive element 420 and/or 422 comprises, or is formed by, a capacitor, or capacitors electrically connected in series and/or in parallel.

Device 400 further comprises a voltage sensor 430 which delivers a value V420 of the voltage across capacitive element 420 and a voltage sensor 332 which delivers a value V120 of the voltage across capacitive element 120. As a variant, voltage sensor 332 is replaced with a sensor of the voltage across capacitive element 422.

Figure 5:
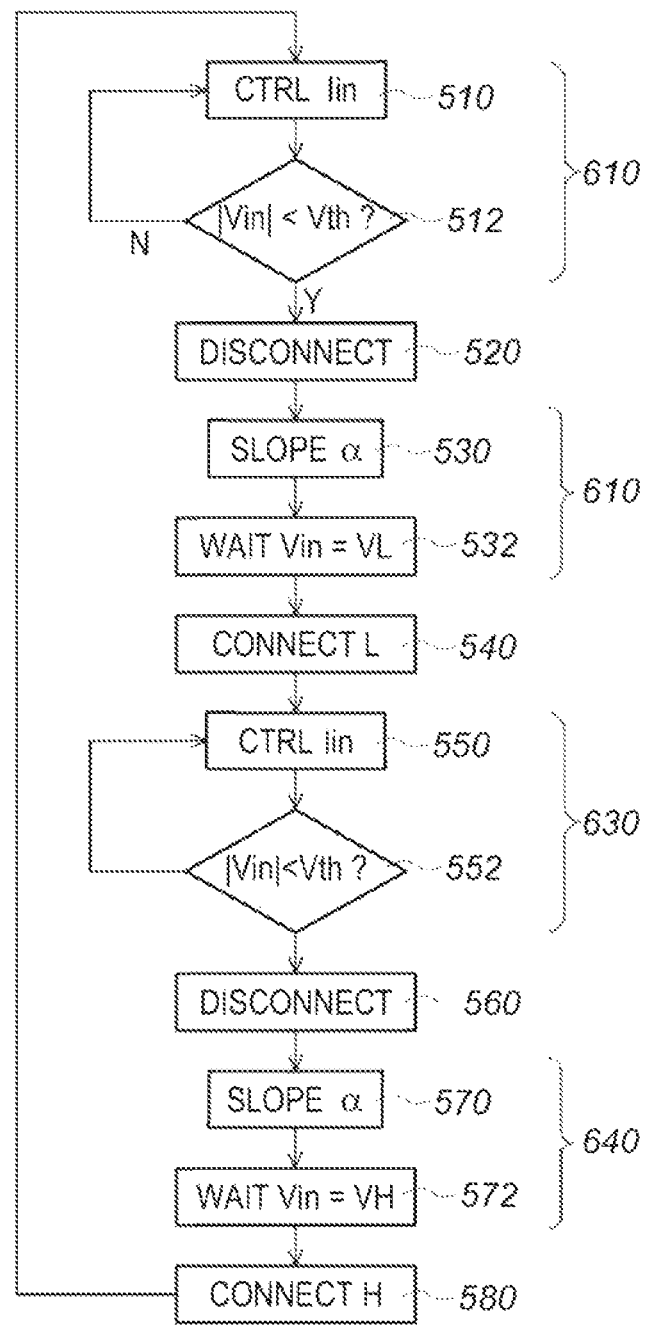
FIG. 5 illustrates an example of a method implemented by the device of FIG. 4.
Figure 6:
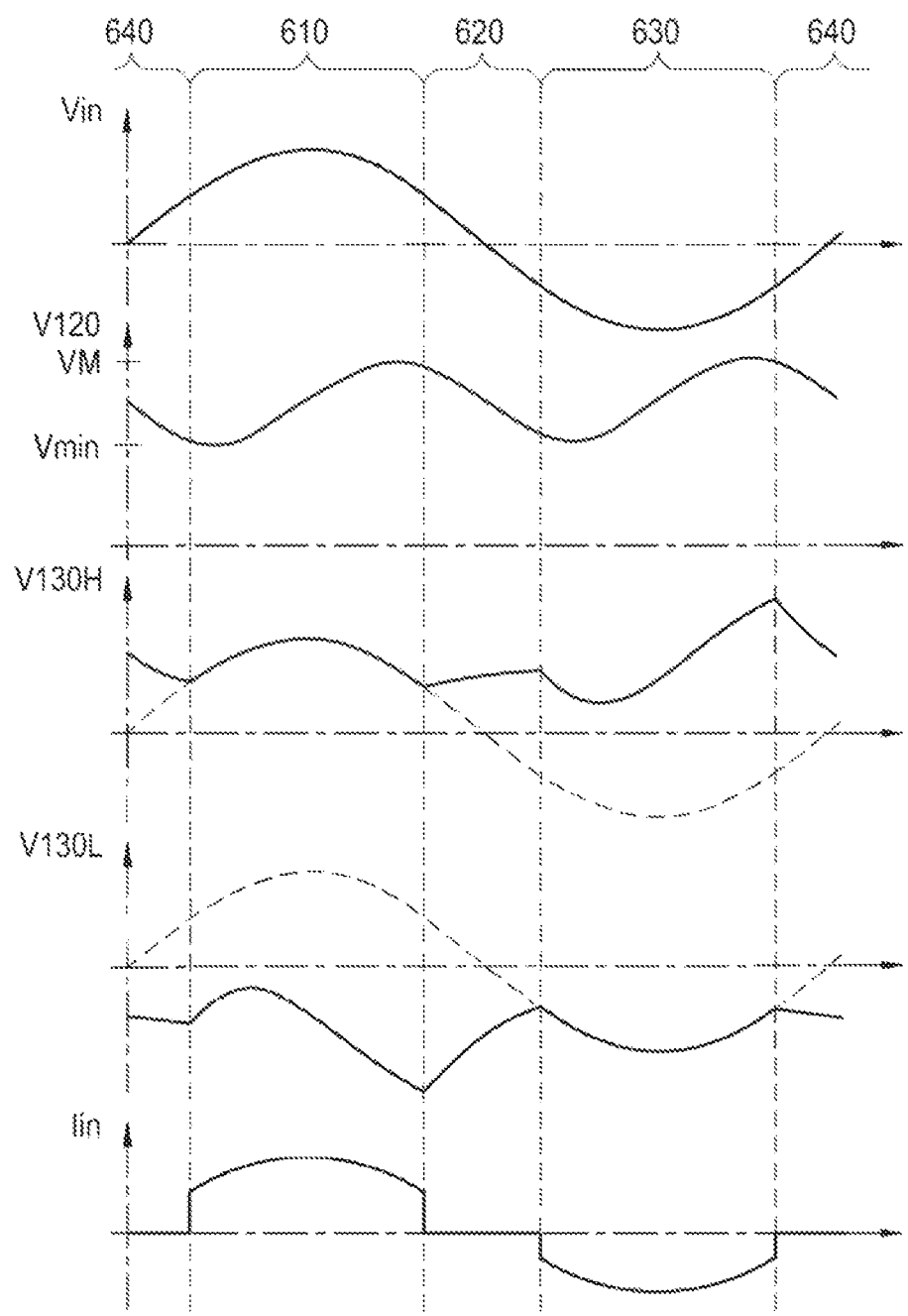
FIG. 6 is a timing diagram illustrating the operation of the device of FIG. 4 when the method of FIG. 5 is implemented

FIG. 5 illustrates an example of a method implemented by the device 400 of FIG. 4. More precisely, the execution of a program contained in memory 412 by processing unit 414 causes the execution of the method of FIG. 5. FIG. 6 is a timing diagram illustrating the operation of device 400 when the method of FIG. 5 is implemented. More precisely, FIG. 6 shows, during two consecutive opposite halfwaves, positive and negative, of the AC input voltage, the value Vin of the AC input voltage, voltage V120 across capacitive element 120, voltages V130H and V130L across the respective switches 130H and 130L, and the algebraic value In of the current entering through input terminal 102.

The AC input voltage successively takes, in absolute value, relatively low (at the beginning and at the end of each halfwave) and relatively high (in the middle of each halfwave) values. Capacitive element 120 receives power when the AC voltage has high values, and restores this power when the AC voltage has low values. For capacitive element 120 to be able to play this role, a capacitance value greater than 100 nF, for example, smaller than 100 µF, and preferably smaller than 10 µF, is selected for capacitive element 120.

From the storage and withdrawal phases, there result variations of the voltage of capacitive element 120, at a frequency which is double that of AC voltage Vin. The voltage varies between a minimum value Vmin and maximum value VM.

The difference between the maximum and minimum values corresponds to an amplitude variation of the voltage across capacitive element 120. This amplitude may be increased with respect to that of a storage element of a power storage device between two stages such as mentioned hereabove, where too strong variations of the power storage voltage would raise problems of operation of the second stage. Preferably, the capacitance value of capacitive element 120 is selected so that the amplitude of the voltage variations is greater than 10% of maximum value VM, when the device operates at a maximum power. As an example, this capacitive value is smaller than 100 µF, preferably smaller than 10 µF. Capacitive element 120 may then be formed of one or a plurality of ceramic-type capacitors, which allows a lifetime and an efficiency improved with respect to chemical capacitors.

In an operating phase 610 located in a central portion of the positive halfwave, switch 130H is in the on state and switch 130L is in the off state. The method comprises two steps 510 and 512 during phase 610.

At step 510 (CTRL Iin), it is acted on the value of duty factor α enabling to obtain current Iin equal to set point value Iref (equal to G*Vin) in average over each switching cycle of switches 132H and 132L. This corresponds to the function of the circuit 310 of FIG. 3.

At step 512 (|Vin|<Vth?), the value Vin of the AC input voltage is compared with a voltage threshold Vth. If value Vin is greater than threshold Vth (N), the method returns to step 510. Otherwise, the method proceeds to a step 520 (DISCONNECT) which ends operating phase 610.

As a variant, steps 510 and 512 are executed in parallel until step 512 results in that value Vin is smaller than Vth.

Conductance value G does not substantially vary during two consecutive halfwaves. Thereby, values Iin and Vin are proportional during phase 610. In the shown case of a sine AC voltage, the input current follows a sine wave portion in phase with the input voltage.

An operating phase 620 starts with step 520. At this step, switches 130H and 130L are both turned off. Thus, input terminal 102 is disconnected, and current Iin remains zero during the entire phase 620.

As an example, the method comprises, during phase 620, two successive steps 530 and 532.

During step 530 (SLOPE α), the duty factor is progressively taken to a predefined value, that is, the duty factor is taken to the predefined value within a longer time, for example, more than 10 times longer, than that of a switching cycle of switches 132H and 132L. Preferably, the duty factor is taken to the predefined value within a time longer than more than 10% of the duration of operating phase 620, more preferably, in addition to half the duration of operating phase 620.

During step 530 (WAIT Vin=VL), the duty factor is maintained at the predefined duty factor value, and it is waited for voltages Vin and V130L to become equal, or substantially equal. Voltage V130L corresponds to the value V420 of the voltage across capacitive element 420. After this step, the method proceeds to a step 540 (CONNECT L) which ends phase 620.

At step 540, switch 130L is turned on. Switch 130H is left off. The fact of waiting for voltages Vin and V130L to be substantially equal enables to decrease to almost zero the currents of charge or discharge of capacitive element 420 by switch 130H at the time when switch 130H is turned on. Various problems of efficiency and/or of damaging of the device components are thus avoided.

Step 540 marks the beginning of an operating phase 630, similar or identical to operating phase 610, with the difference that switch 130L is on and switch 130H is off. Operating phase 630 comprises steps 550 and 552 similar or identical respectively to steps 510 and 512. Operating phase 630 stops at a step 560 (DISCONNECT), similar or identical to step 520.

An operating phase 640 starts at step 560, at which switches 130H and 130L are turned off. In the same way as during phase 620, current Iin is zero. Like phase 620, phase 640 comprises two steps 570 and 572. Step 570 (SLOPE α) is identical or similar to step 530.

During step 572 (WAIT Vin=VH), the duty factor is maintained at a predefined duty factor value, and it is waited for AC voltage Vin and voltage V130H across switch 130H to become equal, or substantially equal. Voltage value V130H corresponds to the difference between the values of voltages V120 and V420.

After step 572, the method proceeds to a step 580 (CONNECT H) which ends phase 640 and starts a new phase 610. At step 580, switch 130L is turned on. Switch 130H is left off.

Thus, as compared with the operation of the device 300 of FIG. 3, the function of circuit 310, that is, the function of acting on the duty factor to obtain value In of the input current equal to a set point value, has been limited to phases 610 and 630 only. Phases 610 and 630, located at the center of each halfwave, are alternated with transition phases, during which AC current Iin becomes zero. This enables to avoid operating modes where the duty factor approaches one of values 0 and 1. The implementation of the switching of switches 132H and 132L is thus simpler in the device 400 of FIGS. 4, 5, and 6 than in the device 300 of FIG. 3.

Preferably, the predefined value of the duty factor reached during step 532 is selected so that the voltage across switch 130L at step 540 (that is, voltage V420) has a predefined voltage value. Preferably, the predefined value of the duty factor reached during step 572 is selected so that the voltage across switch 130H at step 580 (that is, voltage V420) has, in absolute value, the same predefined voltage value.

Although, in the above example, each phase 620, 640 comprises two distinct steps, these two steps may be replaced with any step enabling the respective voltage V130L, V130H to reach at the end of the phase the predefined voltage value.

Preferably, the predefined value common to steps 532 and 572 is equal to the threshold voltage Vth determining the beginning of phases 620 and 640, which enables to obtain periods 620, each symmetrical with respect to the time when AC voltage Vin becomes zero. This enables to decrease, in current Iin, harmonics of even order.

Preferably, the predefined voltage value common to steps 532 and 572 and voltage threshold Vth are selected so that phases 620 and 640 are sufficiently short for the harmonics levels of the current to be compatible with standards such as the above-mentioned EN 61000-3-2 standard.

Figure 7:
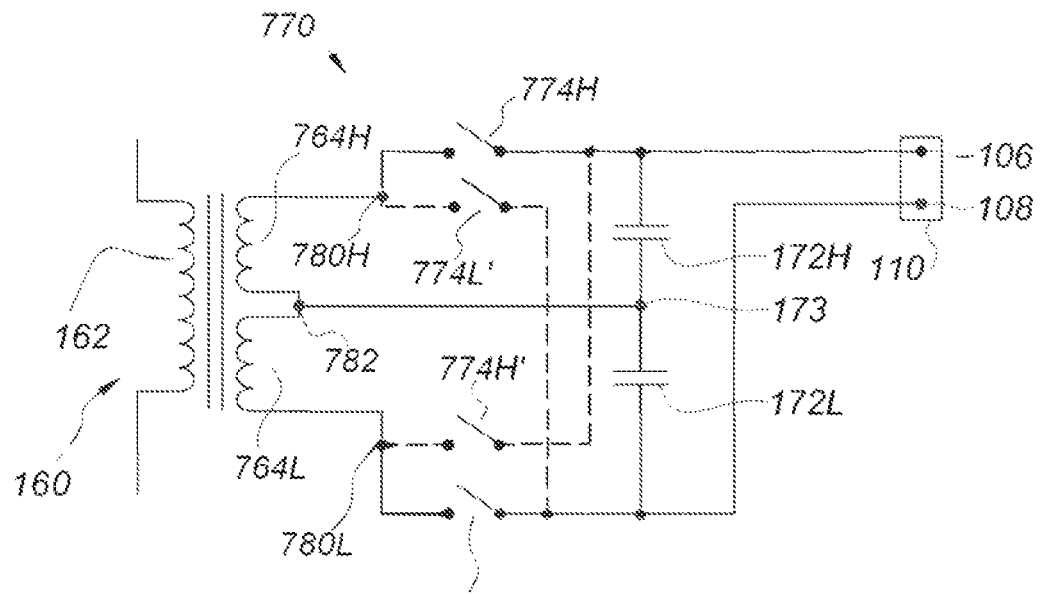
FIG. 7 shows an example of a full wave rectifying circuit of the device of FIG. 1.

FIG. 7 shows an example of a full wave rectifying circuit 770 capable of replacing the circuit 170 of the device of FIG. 1, in the case where transformer 160 comprises, instead of winding 164 (FIG. 1), two windings 764H and 764L electrically in series between two terminals 780H and 780L.

Circuit 770 comprises elements identical or similar to those of the circuit 170 of FIG. 1, arranged identically or similarly. These elements are not described again in detail. Only the differences are highlighted.

The circuit 770 of FIG. 7 differs from the circuit 170 of FIG. 1 in that:

switches 174H and 174L (FIG. 1) are replaced with a switch 774H coupling, preferably connecting, terminal 180H to output terminal 106, and a switch 774L coupling, preferably connecting, terminal 180L to output terminal 108; and junction node 173 of capacitive elements 172H and 172L is coupled, preferably connected, to a junction node 782 of windings 764H and 764L.

In a variant, shown in dotted lines, circuit 770 further comprises a switch 774L' coupling terminal 780H to output terminal 108 and, preferably, a switch 774H' coupling terminal 780L to output terminal 106.

In operation, switches 774H and 774L are controlled identically or similarly to that described hereabove for switches 174H and 174L.

Figure 8:
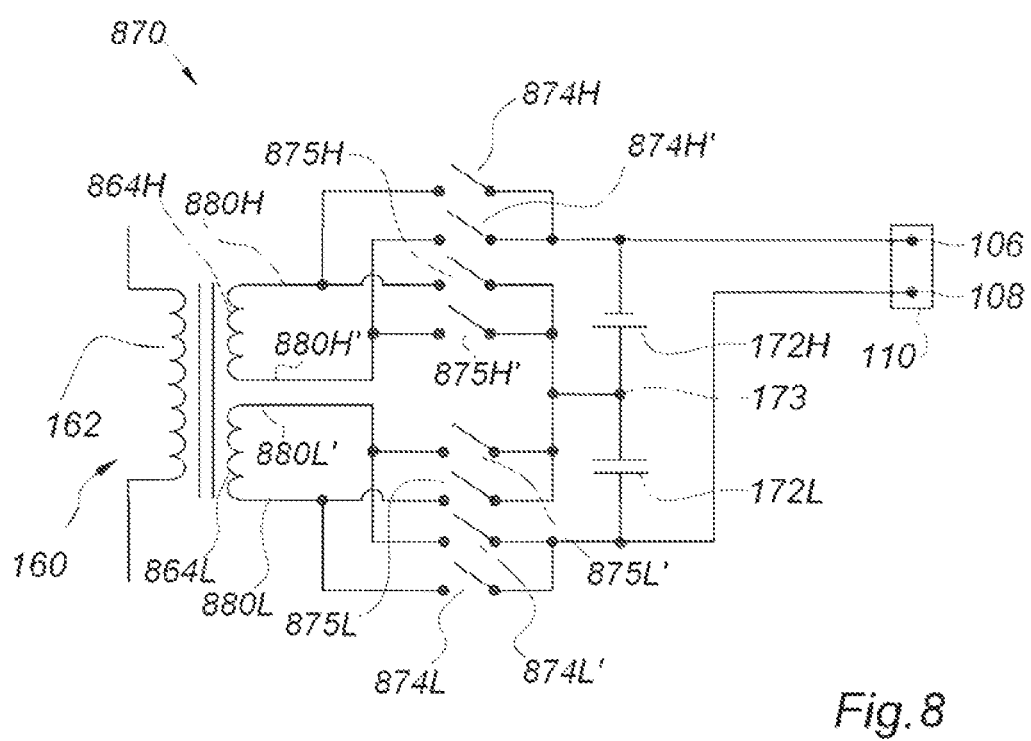
FIG. 8 shows another example of a full wave rectifying circuit of the device of FIG. 1.

FIG. 8 shows another example of a full wave rectifying circuit 870 capable of replacing the circuit 170 of the device of FIG. 1, also in the case where transformer 160 comprises, instead of winding 164 (FIG. 1), two windings 864H and 864L. Winding 864H has terminals 880H and 880H' and winding 864L has terminals 880L and 880L'.

Circuit 870 comprises elements identical or similar to those of the circuit 170 of FIG. 1, arranged identically or similarly. These elements are not described again in detail. Only the differences are highlighted.

Circuit 870 differs from the circuit 170 of FIG. 1 in that switches 174H and 174L (FIG. 1) are replaced with:

a switch_874H coupling, preferably connecting, terminal 180H to output terminal 106, and a switch 874L coupling, preferably connecting, terminal 180L to output terminal 108;

a switch_874H' coupling, preferably connecting, terminal 180H' to output terminal 106, and a switch 874L' coupling, preferably connecting, terminal 180L' to output terminal 108;

a switch_875H coupling, preferably connecting, terminal 180H to node 173 and a switch 875L coupling, preferably connecting, terminal 180L to node 173; and a switch_875H' coupling, preferably connecting, terminal 180H' to node 173 and a switch 875L' coupling, preferably connecting, terminal 180L' to node 173.

In operation, switches 874H and 874L, as well as switches 874H' and 874L', are controlled in a way identical or similar to that described hereabove for switches 174H and 174L.

Various embodiments and variants have been described. Those skilled in the art will understand that certain features of these various embodiments and variants may be combined and other variants will occur to those skilled in the art. In particular, each of the values described hereabove and delivered by sensors such as sensors 105, 150, 182, and 430, or by circuits such as circuits 138, 140, 170, 180, 310, 320, 330, 340, or 410, may be replaced with any value representative of the above-described value.

Finally, the practical implementation of the embodiments and variants described herein is within the capabilities of those skilled in the art based on the functional indications provided hereinabove.

What is claimed is:

1. A device for delivering a DC voltage between two output terminals from an AC voltage applied to first and second input terminals, comprising:
    a first capacitive element;
    two first switches in a half-bridge between terminals of the first capacitive element;
    two second switches electrically coupled in series between the terminals of the first capacitive element;
    a transformer, comprising a first winding placed between a junction node between the first switches and the first input terminals, the second input terminals being coupled to a junction node between the second switches;
    a full wave rectifying circuit delivering the DC voltage, comprising:
        two second capacitive elements electrically coupled in series between the two output terminals; and
        two third switches, each placed between one of the output terminals and a second winding of the transformer;
    a circuit configured to switch the first switches at a frequency and to control the second switches; and
    a circuit configured to control the DC voltage delivered by the device, by acting on said frequency and/or on a delay between a time when an AC current flowing through the second winding changes direction and a next time of switching of the third switches.

2. A device according to claim 1, comprising:
    a voltage sensor delivering a value of the DC voltage; and
    a circuit configured to act on said frequency and/or on said delay based on the value of the DC voltage.

3. A device according to claim 1, comprising a circuit configured to, at each halfwave of the AC voltage, turn on a single one of the second switches during at least a central phase of the halfwave, said single one of the second switches being a function of a sign of the halfwave.

4. A device according claim 1, comprising a circuit configured to regulate a mobile average of a current flowing through the first and second input terminals, according to a current set point, by acting on a duty factor of the switching of the first switches.

5. A device according to claim 4, wherein the current set point has a value representative of a result of a multiplication of a conductance value by a value of the AC voltage.

6. A device according to claim 5, comprising a circuit configured to regulate a value of a voltage of the first capacitive element by acting on said conductance value.

7. A device according to claim 6, comprising, an additional capacitive element coupling a terminal of the first capacitive element to the first terminal of the input terminals.

8. A sevice according to claim 3, comprising a circuit configured to block the second switches during phase of transition of phases between said central phases.

9. A device according to claim 8, comprising a circuit configured to, at each transition phase, progressively vary a duty factor of the switching of the first switches, to obtain a predefined voltage value across the second switches that will be turned on during the central phase following the transition phase.

10. A device according to claim 9, wherein the central phase following each transition phase starts at a time when the AC voltage has said predefined voltage value.

11. A device according to claim 9, wherein the transition phase following each central phase starts at the time when the AC voltage has said predefined value.

12. A device according to claim 1, comprising a circuit configured to obtain a zero voltage between the terminals of each of the first switches at a switching time of the first switches.

13. A device according to claim 1, wherein the transformer has a coupling coefficient smaller than 1.

14. A device according to claim 1, wherein the first switches are HEMT-type transistors.

15. A power supply device comprising a USB-C connector comprising the device according to claim 1.

* * * * *